June 2, 1959     R. J. FRITZ     2,889,314
CONTINUOUS POLYMERIZATION PROCESS AND APPARATUS
Filed Feb. 23, 1956
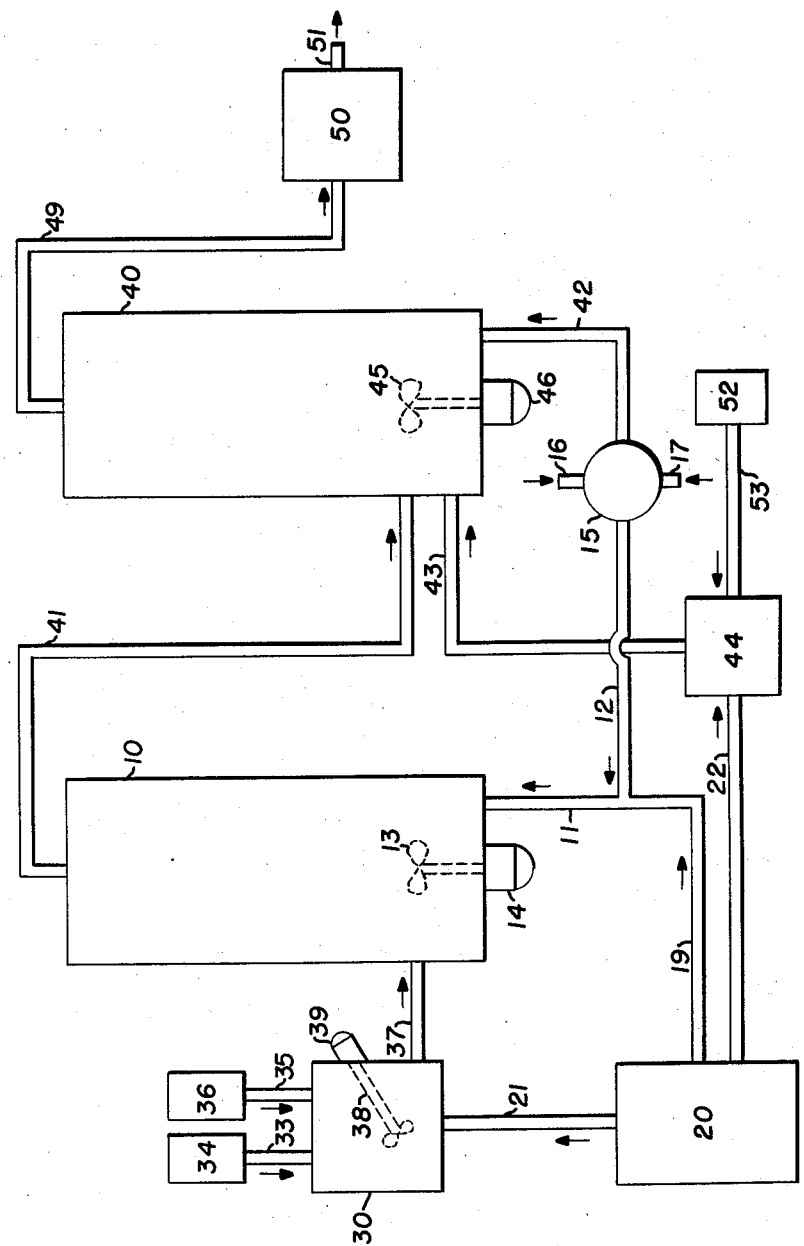
Robert J. Fritz     Inventor
By ZJBrenner Attorney United States Patent Office 2,889,314
Patented June 2, 1959

2,889,314

CONTINUOUS POLYMERIZATION PROCESS AND APPARATUS

Robert Joseph Fritz, Baton Rouge, La., assignor to Esso Research and Engineering Company, a corporation of Delaware Application February 23, 1956, Serial No. 567,239

12 Claims. (Cl. 260—94.9)

This invention relates to polymerization and more particularly relates to an improved continuous polymerization process and apparatus.

It has recently been found that polymeric materials such as polyethylene can be prepared by polymerizing monomers in the presence of a polymerization catalyst obtained by mixing a reducing metal compound (e.g., aluminum diethyl, diethyl aluminum chloride) with a reducible metal compound (e.g., titanium tetrachloride). This new process has been found to have a number of advantages over conventional polymerization processes. More specifically, polymerizations by this new method may be carried out employing moderate pressures and temperatures whereas the conventional polymerization processes have generally required extreme temperatures and pressures. However, this new polymerization process has not been entirely free of difficulties. For example, this new polymerization process has been carried out principally in a batch operation in order to obtain reasonable polymer yields. Furthermore, the products produced have relatively high ash contents which adversely affect the color and electrical properties of the polymeric product. In addition, the polymer yields have been generally lower than desired.

A novel and improved process for polymerizing monomers such as ethylene has now been found wherein the monomers are polymerized in the presence of a catalyst obtained by mixing a reducing metal compound with a reducible metal compound. By the method of this invention it is possible to carry out effectively a continuous polymerization wherein a high yield of polymer is obtained and wherein the polymer product has a low ash content. In accordance with the present invention, olefins such as ethylene and an inert liquid diluent are continuously introduced into a first polymerization zone together with a polymerization catalyst obtained by mixing a reducing metal compound with a reducible metal compound to thereby polymerize the olefins to form polymer. A portion of the resultant polymerization reaction mixture in this first polymerization zone is continuously withdrawn as a stream therefrom and passed to a second polymerization zone. In this second polymerization zone, additional olefins such as ethylene are continuously introduced thereto together with additional reducing metal compound to thereby obtain additional polymerization in this second polymerization zone. A portion of the resultant polymerization mixture in this second polymerization zone is continuously withdrawn as a stream and passed to a separation zone for recovery, from the reaction mixture of the polymer formed in the present process. The present process is particularly useful for polymerizing ethylene to prepare polyethylenes which find use as film-forming materials, lubricant additives, molded and injected plastics and the like.

The present invention will be best understood by reference to the accompanying drawing which sets forth apparatus adapted to carry out the present polymerization process.

Referring now to the drawing, reference numeral 10 designates a first polymerization reactor, and reference numeral 40 represents a second polymerization reactor. In accordance with the present invention, a stream of olefins and inert liquid diluent is continuously introduced to the bottom of reactor 10 through line 11. The olefins are continuously introduced into line 11 through line 12 from vessel 15 wherein the olefins are stored. The olefins may be introduced into vessel 15 through lines 16 and 17. If desired, two different olefins may be introduced to vessel 15 through lines 16 and 17. Generally the present polymerization process is applicable to low molecular weight olefins such as ethylene, propylene, butylene, etc. It will be understood that low molecular weight olefins may also be copolymerized in the present process. For example, copolymers of ethylene with propylene and copolymers of ethylene or propylene with other low molecular weight monoolefins or diolefins can be prepared. The olefins are preferably purified of materials which tend to poison the polymerization catalyst prior to the introduction of these olefins into the present polymerization process. Such poisons include water, oxygen, carbon monoxide, acetylenes, etc. Such poisons may be conveniently removed by passing the olefins through aluminum trialkyls such as aluminum triethyl and/or by passage through a bed of activated alumina or other suitable adsorbents. Although it is preferred to premix the olefins with the inert liquid diluent prior to passage to polymerization reactor 10 as shown in the accompanying drawing, it will be understood that, if desired, the olefins and the inert liquid diluent may be separately introduced to polymerization reactor 10.

The inert liquid diluent employed in the process is introduced into line 11 through line 19 from storage tank 20. Preferably the inert liquid diluent is a hydrocarbon or halogenated hydrocarbon. Specific examples of inert liquid diluents which may be employed include pentane, hexane, heptane, octane, nonane, decane, benzene, toluene chlorobenzene, etc. Also, refined light mineral or petroleum oils may be employed as inert liquid diluent such as those boiling within the range of about 100° to 500° F. The use of saturated aliphatic hydrocarbons containing 5 to 10 carbon atoms is particularly preferred. Chlorobenzene is also a particularly preferred inert liquid diluent.

The polymerization catalyst employed in the present polymerization process is prepared in catalyst preparation vessel 30. The polymerization catalyst is obtained by mixing a reducing metal compound with a reducible metal compound in the presence of inert liquid diluent. The reducing metal compound is stored in tank 34 and is introduced into catalyst preparation vessel 30 through line 33. The reducible metal compound is stored in tank 36 and is introduced to catalyst preparation vessel 30 through line 35. The inert liquid diluent is introduced to catalyst preparation vessel 30 from tank 20 through line 21. When the reducible metal compound and reducing metal compound are mixed together in vessel 30 in the presence of the inert liquid diluent, a precipitate is formed. The catalyst mixture is maintained in suspension or in slurry form by means of agitator 38 driven by motor 39.

The metal compound having reducing properties is generally an aluminum hydride or organo-aluminum compound such as aluminum dialkyls or diaryls or aluminum trialkyls or triaryls. Specific examples of such aluminum compounds include aluminum triethyl, aluminum trimethyl, aluminum triisopropyl, aluminum diethyl bromide, aluminum diethyl chloride, aluminum diphenyl bromide, aluminum diphenyl chloride, aluminum triphenyl, aluminum hydride, ethyl aluminum dihydride, diethyl aluminum hydride and ethoxy aluminum diethyl. In general, the aluminum compounds have the general formula:

where R and R' are members selected from the group consisting of hydrogen, alkyl radicals and aryl radicals and X is a member selected from the group consisting of hydrogen, alkyl radicals, aryl radicals, halogen atoms, alkoxy radicals, aryloxy radicals, secondary amino radicals, secondary acid amide radicals, mercapto radicals, thiophenol radicals, radicals of carboxylic acids and radicals of sulfonic acids. The preferred aluminum compounds are (1) dialkyl aluminum monohalides containing about 2 to 4 carbon atoms in the alkyl groups and chlorine or bromine atoms, particularly chlorine atoms, (2) aluminum trialkyls containing about 2 to 4 carbon atoms in the alkyl groups, and (3) mixtures of (1) and (2) in any proportions. Specific examples include aluminum triethyl, diethyl aluminum chloride and diethyl aluminum bromide, as well as mixtures thereof.

The reducible metal compound is one of a metal of groups IV–B, V–B, VI–B and VIII of the periodic system of elements according to the 35th edition of the Handbook of Chemistry and Physics, pages 392 and 393. Examples of such elements include titanium, zirconium, hafnium, thorium, uranium, vanadium, columbium, tantalum, chromium, molybdenum and tungsten. Examples of the compounds of these metals which may be used include halides such as chlorides or bromides, oxy halides such as oxychlorides, complex halides such as complex fluorides, freshly precipitated oxides or hydroxides, organic compounds such as alcoholates, acetates, benzoates or acetyl acetonates. The preferred salts are those of titanium, zirconium, thorium, uranium and chromium. Titanium salts are particularly preferred such as titanium tetrachloride, titanium oxychloride or titanium acetyl acetonate. Titanium tetrachloride is especially preferred.

The polymerization catalyst formed in catalyst preparation vessel 30 is preferably prepared by continuously introducing reducing metal compound, reducible metal compound and inert liquid diluent thereto. However, if desired, the polymerization catalyst may be prepared on a batch basis. In preparing the catalyst in catalyst preparation vessel 30, the average residence time of the catalyst components therein will generally be in the range of about 0.1 to 2 hours, preferably about 0.5 to 1 hour. The temperature in catalyst preparation vessel 30 should be maintained generally within the range of about 80° to 150° F., preferably about 100° to 120° F. The molar ratio of the reducing metal compound to reducible metal compound should be maintained in the range of about 0.3:1 to 2:1, preferably about 1:1. Generally the concentration of the catalyst mixture prepared in catalyst preparation vessel 30 should be about 0.5 to 5%, preferably about 1 to 2%, by weight, based on inert liquid diluent. The catalyst suspension formed in catalyst preparation vessel 30 is preferably passed continuously through line 37 into polymerization reactor 10.

The materials in polymerization reactor 10 are thoroughly mixed together by means of agitator 13 operated by motor 14. The amount of catalyst passed from catalyst preparation vessel 30 through line 37 and the amount of inert liquid diluent introduced through lines 11 and 19 from tank 20 into polymerization reactor 10 are adjusted to maintain the concentration of the catalyst in the range of about 0.05 to 0.5%, preferably about 0.07 to 0.25%, by weight, based on inert liquid diluent. The average residence time of the materials (that is, the resultant polymerization reaction mixture) in reactor 10 should be maintained generally in the range of about 0.5 to 4, preferably about 1 to 2 hours. The polymerization reaction temperature is maintained generally in the range of about 100° to 200° F., preferably about 120° to 150° F., and the pressure in polymerization reactor 10 is maintained generally in the range of about 1 to 20, preferably about 1 to 5 atmospheres. Generally it will be convenient, particularly when preparing polyethylene, to employ substantially atmospheric pressure. The amount of olefins introduced to polymerization reactor 10 should be sufficient to form about 5 to 25%, preferably about 10 to 15% by weight of polymer based on the polymerization reaction mixture (including inert liquid diluent).

A portion of the resultant polymerization reaction mixture in reactor 10 is continuously withdrawn therefrom as a stream which is passed continuously through line 41 to polymerization reactor 40. In accordance with the present invention, additional olefins are continuously introduced into the bottom of polymerization reactor 40 from storage vessel 15 through line 42. Also in accordance with the present invention additional reducing metal compound is introduced to polymerization reactor 40 from tank 44 through line 43. This additional reducing metal compound is stored in tank 52 and is passed to tank 44 through line 53. If desired, this additional reducing metal compound may be blended in tank 44 with inert liquid diluent passed from tank 20 through line 22 to form a mixture containing about 0.2 to 5%, preferably about .5 to 1.0%, by weight, of reducing metal compound. The reducing metal compound may be the same as that introduced into catalyst preparation vessel 30 but this is not essential. Preferably the reducing metal compound alone or in admixture with the inert liquid diluent is passed continuously from tank 44 through line 43 into polymerization reactor 40. The amount of additional reducing metal compound added to the process in polymerization reactor 40 will generally amount to about 0.01 to 0.05%, preferably about .02 to .04%, by weight, based on inert liquid diluent present in polymerization reactor 40. Expressed in another way, the amount of additional reducing metal compound introduced into polymerization reactor 40, based on the amount of reducible metal compound originally introduced into the process, will be about 0.2:1 to 1:1, preferably about 0.4:1 to 0.8:1, on a molar basis. It should be noted that no additional reducible metal compound is introduced to polymerization reactor 40 and that only reducible metal compound introduced initially into polymerization reactor 10 and withdrawn therefrom through line 41 is passed to polymerization reactor 40. The high polymer yields (based on catalyst) and the low ash contents of the polymeric products accrue primarily from this feature of the present invention.

The contents of polymerization reactor 40 are thoroughly mixed together by means of agitator 45 operated by motor 46. The average residence time of the polymerization reaction mixture in polymerization reactor 40 should be maintained in the range of about 0.5 to 2 hours, preferably about 1 hour. The polymerization reaction temperature in polymerization reactor 40 should be maintained generally in the range of about 100° to 200° F., preferably about 120° to 150° F., and the pressure should be maintained at about 1 to 20, preferably about 1 to 5 atmospheres. The amount of additional olefin introduced to polymerization reactor 40 from vessel 15 through line 42 should be sufficient to form an additional 5 to 25%, preferably about 10 to 15%, of polymer based on the total reaction mixture. However, the total amount of polymer formed in both polymerization reactors should not exceed about 40 weight percent (preferably the amount of polymer should be about 10 to 30 weight percent) of the total polymerization reaction mixture leaving polymerization reactor 40 so that a relatively fluid reaction mixture is produced.

In accordance with the present invention, a portion of the polymerization reaction mixture in polymerization reactor 40 is continuously withdrawn therefrom as a stream and is continuously passed to polymer recovery apparatus 50 by means of line 49. The polymer is recovered from the polymerization reaction mixture in polymer recovery apparatus by conventional techniques. This usually will include filtering of the polymer from the reaction mixture, followed by washing of the polymer with materials such as alcohols, e.g., butyl alcohol, acetone or the like, to remove metal contaminants therefrom, followed by drying of the polymer at temperatures of about 150° to 180° F.

The polymers formed in the present invention will generally have molecular weights of at least about 2,000, usually at least about 10,000. Generally the polymeric products will have molecular weights in the range of about 20,000 to 500,000. However, polymeric products having molecular weights up to 2,000,000 or 5,000,000 or higher may be prepared if desired. The molecular weights referred to herein are number average and assume the relation of intrinsic viscosity to molecular weight to be that given by Harris, Journal of Polymer Science, 8, 361 (1952). The separated, washed and dried polymer is removed from polymer recovery apparatus 50 through line 51. The polymeric products formed in accordance with the present invention may be employed as film-forming materials, lubricant additives, molded and extruded plastics and the like.

The apparatus which is employed to carry out the present polymerization process comprises a first polymerization reactor, a means for continuously introducing olefins and inert liquid diluent to this first polymerization reactor, means for introducing the polymerization catalyst to this first polymerization reactor, a second polymerization reactor, means for continuously passing a portion of the contents of the first polymerization reactor to the second polymerization reactor, means for continuously introducing additional olefins to the second polymerization reactor, means for introducing additional polymerization catalyst components to the second reactor and means for continuously withdrawing a portion of the contents of the second polymerization reactor. Preferably each of the two polymerization reactors is provided with agitation means for thoroughly mixing the contents of each reactor. In carrying out the present process, the apparatus also includes means for mixing together two catalyst components in an inert liquid diluent to form a catalyst mixture for introduction into the first polymerization reactor. The apparatus also preferably includes means for separating and recovering the resultant polymer from the polymerization reaction mixture from the second polymerization reactor. It will be understood that the present apparatus is also provided with the necessary pumps, valves, heat exchangers and the like to carry out the present process and that for purposes of clarity these have not been included in the accompanying drawing. It will also be understood that the principle of the present invention may be extended to include additional polymerization reactors. More specifically, for example, a third polymerization reactor could be employed following the polymerization reactor 40. In accordance with the present invention, additional olefins and additional reducing metal compound would be introduced to this third polymerization reactor but no additional reducible metal compound would be introduced thereto other than that which was introduced to the process in the first polymerization reactor.

The following is a specific embodiment of the present invention. About 10 pounds per hour of aluminum diethyl chloride are continuously passed from tank 34 through line 33 into catalyst preparation vessel 30. At the same time, about 10 pounds per hour of titanium tetrachloride are passed continuously from tank 36 through line 35 into catalyst preparation vessel 30. These two catalyst components are mixed together in catalyst preparation vessel 30 by means of agitator 38 in the presence of n-heptane which is continuously passed thereto at the rate of about 300 gallons per hour from tank 20 through line 21. The pressure and temperature in catalyst preparation vessel 30 are maintained, respectively, at about 1.2 atmospheres and about 100° F. The average residence time of the materials in catalyst preparation vessel 30 is about ⅔ of an hour. About 302 gallons per hour of the resultant suspension of polymerization catalyst in n-heptane are passed continuously from catalyst preparation vessel 30 through line 37 to reactor 10.

About 1200 gallons per hour of n-heptane are continuously passed from tank 20 through line 19 into line 11. At the same time, about 22,000 standard cubic feet (s.c.f) per hour of ethylene are passed from storage vessel 15 through line 12 into line 11 wherein the ethylene is mixed with the n-heptane and through which this mixture is continuously passed into the bottom of polymerization reactor 10.

The contents of the polymerization reactor 10 are thoroughly mixed by means of agitator 13 therein. The pressure and temperature in polymerization reactor 10 are maintained, respectively, at about 1.1 atmospheres and about 150° F. The average residence time of the materials in polymerization reactor 10 is about 2 hours. The amount of polyethylene formed is about 17% by weight based on the total polymerization mixture in polymerization reactor 10 (including the n-heptane).

About 1550 gallons per hour of the resultant polymerization mixture in polymerization reactor 10 (which is generally in the form of a slurry) is passed continuously as a stream from polymerization reactor 10 through line 41 into polymerization reactor 40. At the same time about 200 gallons per hour of n-heptane are continuously passed from tank 20 through line 22 into tank 44 wherein the n-heptane is mixed with about 3 pounds per hour of diethyl aluminum chloride flowing continuously from tank 52 through line 53. About 200 gallons per hour of the mixture of diethyl aluminum chloride in n-heptane are passed continuously through line 43 from tank 44 into polymerization reactor 40. At the same time about 12,000 s.c.f. per hour of ethylene is passed continuously from storage vessel 15 through line 42 into the bottom of polymerization reactor 40.

The contents of polymerization reactor 40 are thoroughly mixed by means of agitator 45 therein. The pressure and temperature in polymerization reactor 40 are maintained, respectively, at about 1.0 atmosphere and about 150° F. The average residence time of the polymerization reaction mixture in polymerization reactor 40 is about 1 hour. The amount of polyethylene formed in polymerization reactor 40 amounts to about 6% by weight based on the total polymerization reaction mixture in polymerization reactor 40 including the n-heptane. About 1900 gallons per hour of the polymerization reaction mixture are withdrawn continuously from polymerization reactor 40 as a stream passing through line 49. This stream contains about 18% by weight of polyethylene.

The product stream flowing through line 49 is continuously passed to polymer recovery apparatus 50. The polyethylene is separated by filtration from the bulk of the product stream by means of a continuous Bird centrifuge. The polyethylene is then washed twice with n-butanol at a temperature of about 190° F. employing a volume ratio of washing agent to polymer of about 2 to 1 in each stage. The polyethylene is then separated from the washing agent by Bird continuous centrifuge followed by a drying extruder. The polymer is then further dried under vacuum at about 180° F. for about 4 hours. About 2300 pounds per hour of polyethylene having a molecular weight of about 75,000 and an ash content of about 0.01 weight percent are thus prepared. It will be seen that the present process makes possible the continuous preparation of polyethylene wherein a high catalyst efficiency (weight of polymer per weight of catalyst) is realized and the polyethylene product has a low ash content.

What is claimed is:

1. An improved process for polymerizing low molecular weight olefins which comprises continuously introducing olefins and inert liquid diluent to a first polymerization zone, introducing to said first polymerization zone a polymerization catalyst to thereby polymerize said olefins to form polymer, said polymerization catalyst being obtained by mixing reducing metal compound of aluminum with reducible metal compound of a metal of groups IV–B, V–B, VI–B, and VIII of the periodic system in an inert liquid diluent, continuously withdrawing a portion of the resultant polymerization mixture as a stream from said first polymerization zone and passing said stream to a second polymerization zone, continuously introducing additional olefins to said second polymerization zone, introducing additional reducing metal compound to said second polymerization zone to thereby obtain polymerization of additional olefins to form additional polymer in said second polymerization zone, continuously withdrawing a portion of the resultant polymerization mixture as a stream from said second polymerization zone and passing said stream to a separation zone for recovery of said polymer.

2. Process according to claim 1 wherein the amount of polymer formed in each of said zones amounts to about 5 to 25% by weight of the polymerization reaction mixture, the total amount of polymer formed in said process not exceeding about 40% by weight of the total polymerization reaction mixture.

3. Process according to claim 1 wherein amount of catalyst introduced to said first polymerization zone is about 0.05 to 0.5% by weight based on inert liquid diluent.

4. Process according to claim 1 wherein the amount of reducing metal compound added to said second polymerization zone is about 0.01 to 0.05% by weight based on inert liquid diluent.

5. Process according to claim 1 wherein the residence time of the polymerization mixture in said first polymerization zone is about 0.5 to 4 hours.

6. Process according to claim 1 wherein the residence time of the polymerization mixture in said second polymerization zone is about 0.5 to 2.0 hours.

7. Process according to claim 1 wherein the temperatures in said zones are about 100° to 200° F. and the pressures in said zones are about 1 to 20 atmospheres.

8. Process according to claim 1 wherein the molar ratio of reducing metal compound to reducible metal compound in the catalyst introduced to said first polymerization zone is about 0.3:1 to 2:1.

9. Process according to claim 1 wherein said olefins consist essentially of ethylene.

10. Process according to claim 1 wherein said aluminum compound is selected from the group consisting of aluminum trialkyls, dialkyl aluminum halides and mixtures thereof.

11. Process according to claim 1 wherein said reducible metal compound is a compound of titanium.

12. An improved ethylene polymerization process which comprises continuously introducing ethylene and an inert liquid diluent to a first polymerization zone, continuously introducing to said first polymerization zone a polymerization catalyst to thereby form polyethylene, said polymerization catalyst being obtained by mixing in an inert liquid diluent, titanium tetrachloride and a reducing compound of aluminum selected from the group consisting of aluminum trialkyls, dialkyl aluminum halides and mixtures thereof, the amount of said catalyst introduced to said first polymerization zone being about 0.07 to 0.25% by weight based on inert liquid diluent and the molar ratio of Al/Ti in said catalyst being about 1 to 1, the residence time of the resultant polymerization reaction mixture in said first polymerization zone being about 0.5 to 4 hours and the amount of ethylene introduced to said first polymerization zone being sufficient to form about 5 to 25% by weight of polyethylene in said polymerization reaction mixture, continuously withdrawing a portion of said polymerization reaction mixtures as a stream from said first polymerization zone and passing said stream to a second polymerization zone, continuously introducing additional ethylene to said second polymerization zone, continuously introducing a reducing compound selected from said aforementioned group in an amount of about 0.02 to 0.04% by weight based on inert liquid diluent to thereby form additional polyethylene in said second polymerization zone in an amount of about 5 to 25% by weight in the polymerization reaction mixture, the total amount of polyethylene formed in said polymerization process being in the range of about 10 to 30% by weight of the total polymerization reaction mixture, the residence time of the polymerization reaction mixture in said second polymerization zone being about 0.5 to 2.0 hours, the reaction temperatures in said zones being about 100° to 200° F. and the pressures in said zones being about 1 to 5 atmospheres, and continuously withdrawing a portion of the polymerization reaction mixture from said second polymerization zone as a stream and passing said stream to a separation zone wherein polyethylene is recovered from the polymerization reaction mixture.

References Cited in the file of this patent

UNITED STATES PATENTS

| 2,373,888 | Hachmuth | Apr. 17, 1945 |
| 2,388,178 | Peterson | Oct. 30, 1945 |
| 2,396,920 | Larson | Mar. 19, 1946 |
| 2,548,003 | Davidson | Apr. 10, 1951 |
| 2,551,145 | Loy | May 1, 1951 |
| 2,643,993 | Tegge | June 30, 1953 |
| 2,666,046 | Nelson | Jan. 12, 1954 |

FOREIGN PATENTS

| 538,782 | Belgium | Dec. 6, 1955 |